US008850198B2

(12) United States Patent
Hafenscher

(10) Patent No.: US 8,850,198 B2
(45) Date of Patent: Sep. 30, 2014

(54) METHOD FOR VALIDATING A ROAD TRAFFIC CONTROL TRANSACTION

(75) Inventor: Albert Hafenscher, Vienna (AT)

(73) Assignee: Kapsch TrafficCom AG, Wien (AT)

( * ) Notice: Subject to any disclaimer, the term of this patent is extended or adjusted under 35 U.S.C. 154(b) by 333 days.

(21) Appl. No.: 13/409,542

(22) Filed: Mar. 1, 2012

(65) Prior Publication Data

US 2012/0246477 A1  Sep. 27, 2012

(30) Foreign Application Priority Data

Mar. 22, 2011  (EP) ..................................... 11450041

(51) Int. Cl.
*H04L 9/32* (2006.01)
*H04L 29/06* (2006.01)
*H04M 17/00* (2006.01)
*H04N 1/00* (2006.01)
*G06K 9/00* (2006.01)
*H04L 9/08* (2006.01)

(52) U.S. Cl.
CPC . *H04L 9/32* (2013.01); *H04L 63/08* (2013.01); *H04M 17/304* (2013.01); *H04M 2017/2525* (2013.01); *H04N 1/00331* (2013.01); *G06K 9/00* (2013.01); *H04L 9/08* (2013.01)
USPC ....................................................... 713/168

(58) Field of Classification Search
CPC ....... H04L 63/08; H04L 9/32; H04M 17/304; H04M 2017/2525; H04N 1/00331; G06K 9/00
See application file for complete search history.

(56) References Cited

U.S. PATENT DOCUMENTS 5,262,860 A * 11/1993 Fitzpatrick et al. ........... 348/461
5,499,294 A *  3/1996 Friedman ...................... 713/179
5,805,710 A *  9/1998 Higgins et al. ................ 382/101

(Continued)

FOREIGN PATENT DOCUMENTS

DE   10 2004 001 007 A1   7/2005
EP        2 088 568 A2    8/2009
WO   WO 2006/085453 A1   8/2006

OTHER PUBLICATIONS

Hayashi, WO 2006085453 A1.*

(Continued)

*Primary Examiner* — Krista Zele
*Assistant Examiner* — Ondrej Vostal
(74) *Attorney, Agent, or Firm* — Fiala & Weaver P.L.L.C.

(57) ABSTRACT

A method for validating a road traffic control transaction. The method includes: storing a cryptographic key assigned to a transaction receiver, in the transaction receiver; recording an image of a vehicle; reading an identification of the vehicle in the recorded image by OCR and generating a control transaction thereof in the control station; generating a random key and encrypting the recorded image into authentication data with the random key and the cryptographic key in the control station; transmitting the recorded image, the control transaction, the random key and the authentication data to the transaction receiver; in the transaction receiver, encrypting the received recorded image into nominal authentication data with the received random key and the stored cryptographic key; and comparing the received authentication data with the nominal authentication data. The received control transaction is then validated when the received authentication data and the nominal authentication data are identical.

10 Claims, 2 Drawing Sheets

(56) References Cited

U.S. PATENT DOCUMENTS

| | | | | |
|---|---|---|---|---|
| 5,862,218 | A * | 1/1999 | Steinberg | 713/176 |
| 5,898,779 | A * | 4/1999 | Squilla et al. | 713/176 |
| 6,058,476 | A * | 5/2000 | Matsuzaki et al. | 713/169 |
| 6,351,813 | B1 * | 2/2002 | Mooney et al. | 713/185 |
| 6,560,339 | B1 * | 5/2003 | Iwamura | 380/201 |
| 6,889,324 | B1 * | 5/2005 | Kanai et al. | 713/176 |
| 7,065,645 | B2 * | 6/2006 | Teicher | 713/167 |
| 2002/0034300 | A1 * | 3/2002 | Thuvesholmen et al. | 380/256 |
| 2002/0141618 | A1 * | 10/2002 | Ciolli et al. | 382/104 |
| 2003/0159046 | A1 * | 8/2003 | Choi et al. | 713/176 |
| 2003/0231249 | A1 * | 12/2003 | Nakamura | 348/231.99 |
| 2004/0112962 | A1 * | 6/2004 | Farrall et al. | 235/462.01 |
| 2004/0170274 | A1 * | 9/2004 | Machida et al. | 380/46 |
| 2004/0252193 | A1 * | 12/2004 | Higgins | 348/149 |
| 2005/0021941 | A1 * | 1/2005 | Ohmori et al. | 713/156 |
| 2005/0035208 | A1 * | 2/2005 | Elliot et al. | 235/472.01 |
| 2005/0063027 | A1 * | 3/2005 | Durst et al. | 359/2 |
| 2005/0078088 | A1 * | 4/2005 | Davis et al. | 345/163 |
| 2005/0102527 | A1 * | 5/2005 | Tatebayashi et al. | 713/189 |
| 2005/0141010 | A1 * | 6/2005 | Kanai | 358/1.14 |
| 2005/0289061 | A1 * | 12/2005 | Kulakowski et al. | 705/50 |
| 2006/0031674 | A1 * | 2/2006 | Sakurai | 713/166 |
| 2006/0031829 | A1 * | 2/2006 | Harris et al. | 717/173 |
| 2006/0036864 | A1 * | 2/2006 | Parulski et al. | 713/176 |
| 2006/0061806 | A1 * | 3/2006 | King et al. | 358/1.15 |
| 2006/0155398 | A1 * | 7/2006 | Hoffberg et al. | 700/86 |
| 2006/0173776 | A1 * | 8/2006 | Shalley et al. | 705/39 |
| 2006/0200258 | A1 * | 9/2006 | Hoffberg et al. | 700/86 |
| 2006/0269104 | A1 * | 11/2006 | Ciolli | 382/104 |
| 2007/0025589 | A1 * | 2/2007 | Okamoto et al. | 382/100 |
| 2007/0053513 | A1 * | 3/2007 | Hoffberg | 380/201 |
| 2007/0070038 | A1 * | 3/2007 | Hoffberg et al. | 345/156 |
| 2007/0172222 | A1 * | 7/2007 | Kakutani et al. | 396/266 |
| 2008/0137971 | A1 * | 6/2008 | King et al. | 382/229 |
| 2008/0205642 | A1 * | 8/2008 | Yururi | 380/200 |
| 2008/0209223 | A1 * | 8/2008 | Nandy et al. | 713/185 |
| 2008/0217411 | A1 * | 9/2008 | Ledwith et al. | 235/472.02 |
| 2008/0298596 | A1 * | 12/2008 | Kuraki et al. | 380/283 |
| 2009/0136032 | A1 * | 5/2009 | Tamura | 380/243 |
| 2009/0202105 | A1 | 8/2009 | Castro Abrantes et al. | |
| 2009/0285390 | A1 * | 11/2009 | Scherer et al. | 380/44 |
| 2010/0034380 | A1 * | 2/2010 | Lee | 380/243 |
| 2010/0153724 | A1 * | 6/2010 | Staring | 713/169 |

OTHER PUBLICATIONS

SC info & inno GMBH, "Vefahren zum Erheben einer Strabenbenutzungs-Maut", DE200410001007.*

Fialho Basilio et al., EP 2088568A2.*

Extended European Search Report for corresponding European Application No. 11450041.6, dated Sep. 22, 2011, 9pp.

Office action dated Mar. 19, 2012 issued in corresponding European Patent Application No. 11 450 041.6, 6pp.

* cited by examiner

METHOD FOR VALIDATING A ROAD TRAFFIC CONTROL TRANSACTION

CROSS-REFERENCE TO RELATED APPLICATION(S)

This application claims priority to European Patent Application No. 11 450 041.6, filed on Mar. 22, 2011, the contents of which are hereby expressly incorporated by reference.

FIELD OF THE INVENTION

The present invention pertains to a method for validating a road traffic control transaction that is generated by recording an image of a vehicle in a control station of a road traffic control system and reading an identification of the vehicle in the recorded image by OCR.

BACKGROUND

Road traffic control systems in which the control transactions are based on video recordings of the traffic at a control station are referred to as "video control systems". The systems can be used for various control purposes such as, e.g., for controlling the presence of a vehicle in a certain locality to calculate the fee for using this locality in the form of a road toll, zone toll or parking fee, for evidence purposes in the enforcement of speed limits or other traffic violations, for monitoring the compliance with hazardous materials transport regulations, the proper execution of winter road maintenance or street cleaning assignments, fleet vehicles entering and exiting business premises or rental cars entering and exiting car rental facilities, and the like.

Typically, the vehicles are identified based on an optical character recognition (OCR) of the vehicle identification in the recorded images. In practice, the operator of the road traffic control system (in a road toll system: the "Toll Charger," TC) is not the same entity as the recipient and processor of the control transactions, which is usually the owner of the road traffic control system or a state agency ("Contract Issuer," CI). For the latter, the validation of the control transactions received from the operator with respect to legitimacy or authenticity is of decisive importance in order to prevent transactions that did not take place from being billed, charged or attributed to the users or persons liable to control.

EP 2 088 568 document discloses a control station that prepares an electronic document with other vehicle recordings and with additional data, e.g., a vehicle identification read by OCR or the detected vehicle type, in case of a violation. Before a prepared document is sent to the central office via a possibly insecure communication link, the document is signed in accordance with a conventional private-public-key process. Although this makes it possible to detect a manipulation on the transmission link, a validation or authentication of the entire control transaction including the document preparation cannot be achieved such that each of the control stations needs to be elaborately secured with additional sensor systems.

SUMMARY

In some embodiments, the present invention is a method for validating a road traffic control transaction that is sent from a control station of a road traffic control system to a transaction receiver of the road traffic control system. The method includes: storing a cryptographic key assigned to the transaction receiver, in the transaction receiver and in a separate processing element of the control station; recording an image of a vehicle, reading an identification of the vehicle in the recorded image by OCR and generating a control transaction thereof in the control station; generating a random key and encrypting the recorded image into authentication data with the random key and the cryptographic key in the separate processing element of the control station; transmitting the recorded image, the control transaction, the random key and the authentication data to the transaction receiver; in the transaction receiver, receiving the recorded image, the control transaction, the random key, and the authentications data, and encrypting the received recorded image into nominal authentication data with the received random key and the stored cryptographic key; and comparing the received authentication data with the nominal authentication data. The received control transaction is then validated when the received authentication data and the nominal authentication data are identical.

The aforementioned control station may be realized stationary or mobile, feature one or more cameras and also have geographically distributed components such as, for example, a remote proxy computer for the OCR evaluation of the vehicle identification.

In some embodiments of the invention, several cryptographic keys assigned to different transaction receivers are stored in the processing element and the cryptographic key to be respectively used is selected in dependence on the vehicle identification read by OCR. In this way, control transactions for various transaction recipients such as, e.g., different agencies, police, fire department, road maintainer, etc., respectively can be individually authenticated directly at their origin and then validated.

In some embodiments, the authentication data and the random key are sent to the transaction receiver together with the control transaction such that the control transaction directly carries along the data that allows its validation. The authentication data and the random key may also be sent to the transaction receiver together with the recorded image, wherein corresponding references to the control transaction are provided in this case.

According to some embodiments of the invention, the random key defines an image section in the recorded image and the aforementioned encryption of the recorded image with the random key comprises the step of extracting the image section from the recorded image and the step of forming a first hash value of the image section.

The extracted image section may also contains the identification of the vehicle such that the validation security is increased.

In some embodiments, the second encryption is also carried out with the aid of a hash value formation, i.e., the aforementioned encryption of the recorded image with the cryptographic key comprises the step of forming a second hash value of the first hash value and the cryptographic key, wherein the second hash value then represents the authentication data.

The aforementioned image section may include any part of the recorded image that can be defined by the random key. For example, the random key defines the corner points of a peripheral contour that encloses a flat image section. Alternatively or in addition, the random key could define color values for image pixels and all image pixels with these color values jointly form the aforementioned image section.

In some embodiments of the invention, a time stamp, an identification of the control station, an identification of the processing element and/or a serial count value may be integrated into the authentication data. Each of these specifications can be used for subsequent plausibility checks and therefore increases the security of the validation.

It is furthermore possible to store several cryptographic keys with assigned key identifications in the transaction receiver and in the processing element, as well as to integrate the key identification of the key used into the authentication data and to use the integrated key identification for determining the assigned key in the transaction receiver. This can also increase the security of the system.

BRIEF DESCRIPTION OF THE DRAWINGS

The invention is described in greater detail below with reference to one exemplary embodiment that is illustrated in the attached drawings.

DETAILED DESCRIPTION

The method of the present invention enables a transaction recipient (contract issuer) to check control transactions and to reject unauthenticated control transactions directly at the interface with the control system operator such as, e.g., a toll system operator (toll charger). In some embodiments, the invention is based on the utilization of a separate processing element that is trusted by the transaction receiver and consequently provided with a cryptographic key of the transaction receiver in the control station. Authentication data for the transaction receiver is generated in connection with a random key of the control station that is unique to each transaction or recorded image and enables the transaction receiver to validate the original control transaction based on the originally recorded image—by checking the authentication data in an autarkic fashion on its end.

Figure 1:
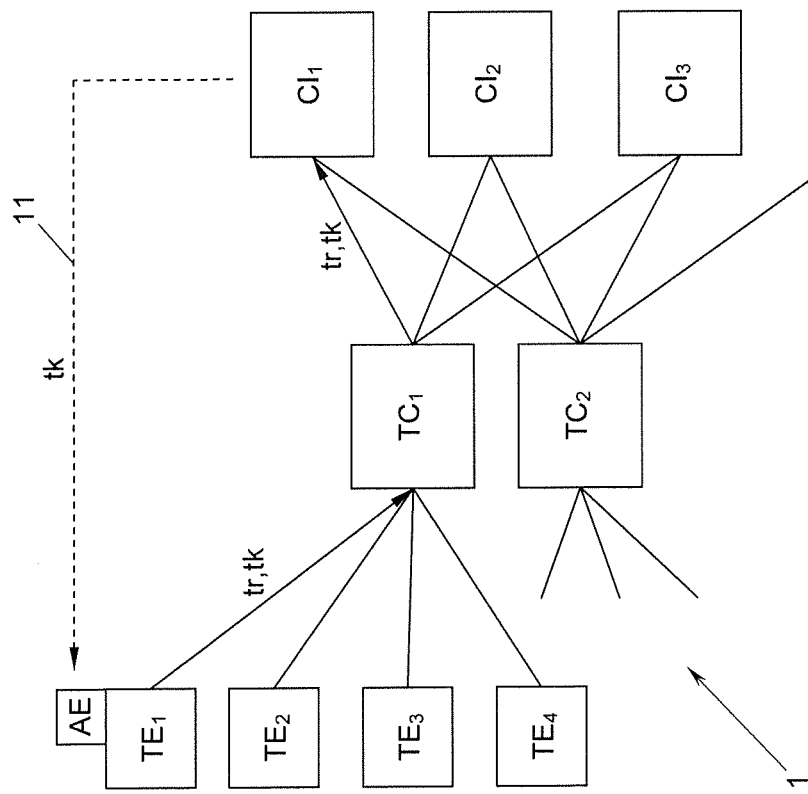
FIG. 1 shows a block diagram of an exemplary road traffic control system in the form of an interoperable road toll system, according to some embodiments of the present invention.

As shown in FIG. 1, control transactions tr are generated by a plurality of different control stations (in this case, Tolling Entities) TE in an interoperable road traffic control system (in this case, a road toll system 1) and sent to transaction recipients CI (Contract Issuers) for processing and/or billing purposes via operator-specific central offices (in this case, Toll Chargers) TC. Transaction receivers CI can receive control transactions tr from various central offices TC of the operator, and these can in turn be connected to a plurality of different control stations TE, one of which is illustrated in an exemplary fashion in FIG. 2.

Figure 2:
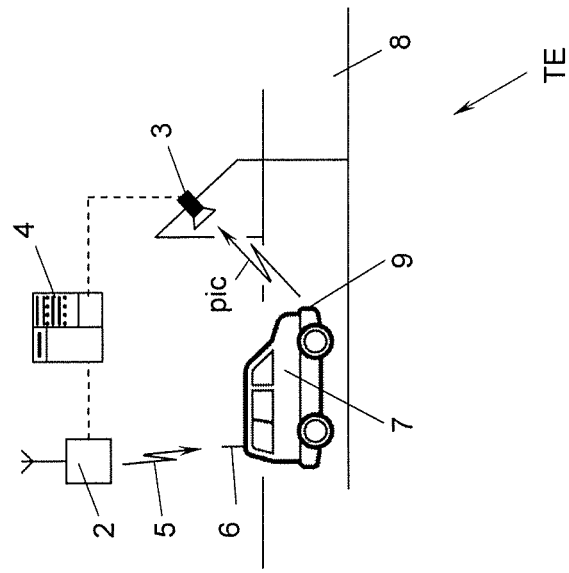
FIG. 2 schematically shows an exemplary control station of a road toll system, according to some embodiments of the present invention.

The control station TE according to FIG. 2 comprises an optional radio beacon 2 that operates, e.g., in accordance with the Dedicated Short Range Communication (DSRC) standard or the Wireless Access in a Vehicle Environment (WAVE) standard. The control station further includes a photo or video camera 3, wherein the radio beacon and the camera are connected to a station computer 4 that, in turn, is connected to the central office TC (FIG. 1). The radio beacon 2 makes it possible to generate, for example, DSRC-based toll transactions based on its radio communication 5 with vehicle Onboard Units (OBUs) 6 that are carried along by vehicles 7 passing the station TE on a road 8.

The camera 3 can generate video-based control transactions and record an image "pic" of the vehicle 7. A vehicle identification 9 on a license plate of the vehicle 7 is subsequently read by OCR. The result of the OCR evaluation of the recorded image pic in the form of the vehicle identification 9 forms the basis of a video-based control transaction tr. For example, after the control transaction is supplemented with a current time stamp, a measured speed value of the vehicle and/or an identification of the control station TE or camera 3, it is sent to the transaction receiver CI via a central office TC.

In some embodiments of the invention, the supplemented control transaction is sent from the control station to the transaction receiver via a first channel and the recorded image is sent from the control station to the transaction receiver via a second channel, wherein the supplemented control transaction and the corresponding recorded image are assigned to one another in the transaction receiver with the aid of at least one mutual reference provided therein. Consequently, it is not imperative that the control transactions and the recorded images arrive simultaneously at the transaction receiver; for example, the recorded images could be stored in databases and made available to the transaction receiver for validation purposes in this form.

The vehicle identification 9 may include the registered license number of the vehicle or another identification of the vehicle that can be read by OCR such as, a hazardous materials identification, a fleet identification, and the like.

To enable the transaction receivers CI to carry out a validation (authentication) of such video-based transactions tr, video-based control stations TE are equipped with a separate processing element (e.g., an Authentication Entity) AE that may be assigned to the entire control station or assigned individually to one or each camera 3.

In a step 11 (FIG. 1), a cryptographic key (trusted key) tk, specifically assigned to and trusted by a transaction receiver CI, is stored in the transaction receiver CI, as well as in each control station TE, from which control transactions tr should be received, particularly in the respective processing element AE of the control station TE.

Figure 3:
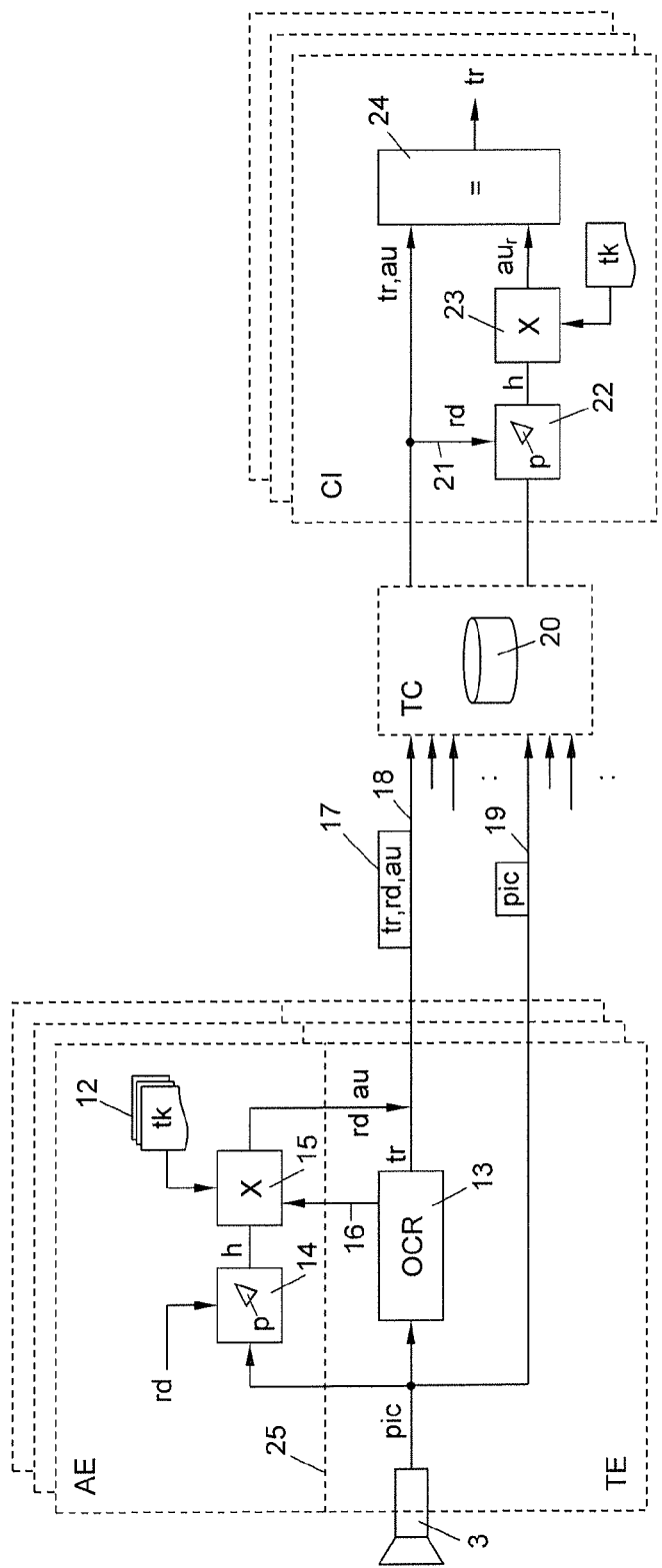
FIG. 3 shows an exemplary signal flow chart for validating control transactions within the road toll system, according to some embodiments of the present invention.

FIG. 3 shows exemplary signal flows or processing steps being carried out when a vehicle 7 passes a control station TE that is equipped with such a processing element AE and generates a control transaction tr that is sent to an exemplary transaction receiver CI via the operator's central office TC. The cryptographic keys tk of the different transaction receivers CI, to which the control station TE can send control transactions tr, are already stored in the processing element AE, that is, tk-dataset 12.

The camera 3 records an image "pic" of the vehicle 7 while it passes the control station TE. Subsequently, a control transaction tr is generated from the recorded image in an OCR process 13 based on the result of reading the vehicle identification 9 by OCR. The control transaction tr may contain other data such as a time stamp, an identification of the control station TE and/or camera 3, an identification of the processing element AE, a serially incremented count value (transaction counter), and the like. The OCR process 13 could also be calculated in a geographically remote (not-shown) proxy computer to be assigned to the control station.

The processing element AE receives the recorded image pic and generates a random key rd therefor. Based on this random key rd, a random image section p is extracted from the recorded image pic and a hash value h(p) of the image section p is formed, e.g., by a modulo addition of the image pixels in the image section p, namely in a process 14. The random key rd directly specifies, for example, the image coordinates of at least three image pixels in the recorded image pic that generate or define the image section p. The random key rd could also specify certain properties of image pixels such as, e.g., color values, wherein all image pixels with these properties then form the image section p.

In the context of the present description, the term "formation (or generation) of a hash value" refers to the application of a practically irreversible n:1 transformal function to the input value, i.e., a function that is only reversible in an (extremely) ambiguous fashion, such that knowledge of the hash value practically makes it impossible to deduce the initial value (in this case: the image section). Examples of such hash functions are the checksum function, the modulo function, and the like.

The extraction of a random image section p from the recorded image pic and the formation of a hash value h of the image section p only requires minimal computing power and therefore can also be realized in real time, e.g., with a simple processor in the processing element AE such as, for example, a processor of the type provided on chip cards or SIM cards. Consequently, it suffices to provide the processing element with an low computing power, because the encryption taking place therein is, as far as the random key is concerned, limited to the extraction of a random image section from the recorded image and the formation of a hash value thereof. The extraction of an image section reduces the data volume significantly and the formation of a hash value is a very simple computational process. The aforementioned hash value therefore is already available in the form of a significantly reduced input dataset for the further encryption with the cryptographic key, wherein any encryption method known from the pertinent technology can be applied with minimal effort.

In a process 15, the formed hash value h is subsequently encrypted again with the cryptographic key tk of the respective transaction receiver TE, to which the control transaction tr is sent. However, the encryption process 15 may also be realized by once again forming a hash value of the aforementioned hash value h and the cryptographic key tk.

The correct key tk can be selected, for example, based on allocation lists ("white lists") of vehicle identifications 9 and appropriate transaction receivers CI. That is, the result of the OCR process 13 controls the selection of the cryptographic key tk from the set 12 (arrow 16).

The resulting authentication data au obtained at the output or end of the process 15 is added to the control transaction tr together with the random key rd such that, it is expanded into a supplemented control transaction (tr, rd, au) 17. In this case, other data such as a time stamp, an identification of the control station TE and/or camera 3, an identification of the processing element AE, a serially incremented count value (transaction counter), etc., may also be added to the authentication data au or integrated therein.

The supplemented control transaction 17 is subsequently sent to the transaction receiver CI via a first transmission channel 18 that also may comprise, for example an operator's central office TC along its path. The basis of the control transaction tr in the form of the recorded image pic is also sent to the transaction receiver CI via a second transmission channel 19. The transmission via the first and the second transmission channel 18, 19 does not have to take place simultaneously. For example, the supplemented control transactions 17 and the recorded images pic can also be intermediately stored, e.g., in databases 20 of the operator's central office TC and retrieved by the transaction receiver CI. This embodiment also falls within the scope of the term "sending" in this context. In some embodiments, the method of the present invention adds the authentication data au and the random key rd to the image data pic, rather than the control transaction tr. All data tr, rd, au, pic can also be sent via the same transmission channel.

The processing element that serves as authentication unit may include a software element, as well as a hardware element. In some embodiments, a hardware element is used that is connected to the control station via a physical interface, e.g., like a cryptographically secured hardware module (Secure Access Module, SAM), a USB-Token, etc. In this respect, it would also be conceivable that the separation of the interface renders the hardware element unusable in order to prevent manipulations and to provide improved protection of confidence for the transaction receiver.

In some embodiments, only a single encryption process or encryption step may also be carried out in the processing element AE, instead of processes 14, 15 shown. In this case, the recorded image pic is encrypted into the authentication data au with the random key rd and the cryptographic key tk in one step during this single encryption process. For example, the random key rd and the cryptographic key tk could be combined into a common key that is applied to the recorded image pic to obtain the authentication data au.

The received supplemented control transactions 17 and the recorded images pic forming the basis thereof are subsequently combined, i.e., assigned to one another, in the transaction receiver CI. This may, for example, be based on at least one mutual reference in one of these datasets such as, a reference to a specific identification of a recorded image pic in the control transaction tr, or a reference to a specific identification of a control transaction tr in a recorded image pic, or both. The transaction receiver CI can also merely validate control transactions tr at random, in which it only processes or receives the correspondingly assigned recorded image pic, e.g., from the database 20 of the operator's central office TC, upon a corresponding request. In some embodiments, an assignment is not necessary if the recorded image pic is received together with the supplemented control transaction 17.

In a step 21, the random key rd is now extracted from the supplemented control transaction 17 in the transaction receiver CI and applied to the received and assigned recorded image pic in a process 22, similar to the process 14, in the processing element AE to once again obtain the random image section p and to form the hash value h thereof. The hash value h is once again encrypted with the cryptographic key tk of the transaction receiver CI in a process 23 that is similar to the process 15, carried out in the processing element AE to obtain reference or nominal authentication data aur. This data is subsequently compared with the authentication data au extracted from the supplemented control transaction 17 in a step or process 24. The transaction tr is then validated if the two authentication datasets are identical, i.e., the transaction is considered to be authenticated and cleared for further processing and/or billing in the transaction receiver CI. If the two authentication datasets are not identical, an error or a manipulation has occurred, accordingly, the transaction tr is not validated (invalid) and discarded. Subsequently, a corresponding alarm message can be output and logged.

In some embodiments, (not shown) several different cryptographic keys tki are stored for each transaction receiver CI in the dataset 12 of the processing element AE and in the transaction receiver CI—together with a respectively assigned key identification tkID. A key tki of the respective transaction receiver CI is then selected in the processing element AE together with its key identification tkID and used for the encryption. The key identification tkID of the key tki used is then added to the authentication data au and used for identifying the correct key tki in the transaction receiver CI.

In some embodiments, the processing element AE may be realized in the form of a cryptographically secured software module or a physically secured hardware element. The processing element AE can be connected to the control station TE, (that may simply consist of the camera 3 only) via a physical interface 25. The method of the present invention ensures that an unauthorized separation of the interface 25 renders the processing element AE in the form of a hardware element unusable. For example, a separation of the interface 25 irretrievably erases the memory of the processing element AE or at least permanently blocks any access to the cryptographic keys rd, tk stored therein.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for validating a road traffic control transaction that is sent from a control station of a road traffic control system to a transaction receiver of the road traffic control system, the method comprising:

storing a cryptographic key assigned to the transaction receiver, in the transaction receiver and in a separate processing element of the control station;

recording an image of a vehicle, reading an identification of the vehicle in the recorded image by OCR and generating a control transaction thereof in the control station;

generating a random key and encrypting the recorded image into authentication data with the random key and the cryptographic key in the separate processing element of the control station;

transmitting the recorded image, the control transaction, the random key and the authentication data to the transaction receiver;

in the transaction receiver, receiving the recorded image, the control transaction, the random key, and the authentications data, and encrypting the received recorded image into nominal authentication data with the received random key and the stored cryptographic key; and comparing the received authentication data with the nominal authentication data, wherein the received control transaction is validated when the received authentication data and the nominal authentication data are identical.

2. The method according to claim 1, further comprising storing a plurality of cryptographic keys assigned to different transaction receivers in the processing element, and selecting a cryptographic key to be respectively used, depending on the identification read by OCR.

3. The method according to claim 1, further comprising sending the authentication data and the random key to the transaction receiver together with the control transaction.

4. The method according to claim 1, further comprising sending the authentication data and the random key to the transaction receiver together with the recorded image.

5. The method according to claim 1, wherein the random key defines an image section in the recorded image, and wherein said encryption of the recorded image with the random key comprises extracting the image section from the recorded image, and forming a first hash value of the image section.

6. The method according to claim 5, wherein said encryption of the recorded image with the cryptographic key comprises forming a second hash value of the first hash value and the cryptographic key, and wherein the second hash value represents the authentication data.

7. The method according to claim 1, further comprising integrating into the authentication data one or more of a time stamp, an identification of the control station, an identification of the processing element, and a serial count value.

8. The method according to claim 1, further comprising storing a plurality of cryptographic keys in the transaction receiver and in the processing element together with assigned key identifications, wherein the key identification of the key used is integrated into the authentication data and used for determining the assigned key in the transaction receiver.

9. The method according to claim 1, wherein a hardware element is used as said processing element and connected to the control station via a physical interface.

10. The method according to claim 9, wherein a separation of the physical interface renders the hardware element unusable.

* * * * *